US 6,460,999 B1

(12) United States Patent
Suzuki (10) Patent No.: US 6,460,999 B1
(45) Date of Patent: Oct. 8, 2002

(54) PROJECTOR AND THE PROTECTOR THEREOF (75) Inventor: Toshio Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 09/653,054

(22) Filed: Sep. 1, 2000

(30) Foreign Application Priority Data

Sep. 3, 1999 (JP) ............................................. 11-250275

(51) Int. Cl.$^7$ ........................... G03B 21/14; G03B 3/00; G03B 21/00
(52) U.S. Cl. ........................ 353/79; 353/101; 353/122; 353/44
(58) Field of Search ........................... 353/101, 44, 50, 353/66, 77, 79, 81, 98, 122

(56) References Cited

U.S. PATENT DOCUMENTS 5,221,977 A * 6/1993 Leib et al. ..................... 359/15
6,002,505 A * 12/1999 Kraenert et al. ............. 359/196

OTHER PUBLICATIONS

Burrows et al. "Video Production: Disciplines and Techniques", Eighth Edition, McGraw–Hill Higher Education, pp. 104–105.*

* cited by examiner

Primary Examiner—Alan A. Mathews
Assistant Examiner—Melissa Koval
(74) Attorney, Agent, or Firm—Frommer Lawrence & Haug LLP; William S. Frommer (57) ABSTRACT

Disclosed are a projector and the protector thereof having superior safety and practicality. The projector for projecting an image on a screen comprises sensors for performing detection in an area to be subjected to detection that is a local space. The local space is located on the outside of a projection space area which projecting light passes through, and extends along an outer edge of the projection space area. When the sensors detect an object in the area to be subjected to detection, a general controller of the projector turns off a power source of a lamp unit that is a light emitting source, and thus the general controller causes the projector to stop projecting. This prevents damage to the eyes of a person who carelessly looks into a projection lens.

14 Claims, 8 Drawing Sheets

PROJECTOR AND THE PROTECTOR THEREOF

BACKGROUND OF THE INVENTION

1. Field of the Invention

The present invention relates to a projector for projecting an image on a screen or the like and a protector for protecting the eyes of a person from projecting light emitted by the projector.

2. Description of the Related Art

Generally, a projector such as a liquid crystal projector for projecting an image on a screen located at a remote position is configured so as to emit projecting light by the use of a light source having a relatively high output (e.g., a halogen lamp or the like). Thus, Japanese Unexamined Utility Model Application Publication No. Hei 5-8556 proposes a projector comprising a sensor for detecting the presence or absence of an object (a person) in a space area (hereinafter referred to as a projection space area) which projecting light passes through for the purpose of preventing damage to the eyes of a person who carelessly looks into a projection lens or the like of the projector, wherein projection is stopped when the sensor detects an object in the projection space area.

In general, a person who gives an explanation of the image or the like is near the screen. The position at which the explaining person stands is the position having relatively low intensity even in the projection space area of the projector. Thus, the explaining person does not suffer damage to his/her eyes by the projecting light at the position. However, the above-mentioned projector described in Japanese Unexamined Utility Model Application Publication No. Hei 5-8556 may detect even the explaining person at the position and thus stop projecting. Therefore, the projector is disadvantageous for practical use.

The above-mentioned projector described in Japanese Unexamined Utility Model Application Publication No. Hei 5-8556 is designed so as to stop projecting only after detecting the entry of a person into the projection space area of the projector. However, the projector has a possibility that a person may look into the projection lens or the like before projection is stopped.

SUMMARY OF THE INVENTION

The present invention is designed to overcome the foregoing problems. It is an object of the present invention to provide a projector and the protector thereof having superior practicality and safety.

A projector according to the present invention comprises projecting means for projecting an image on a screen; detecting means for detecting the presence or absence of an object in an area to be subjected to detection, which is a local space near an outer edge of a projection space area which projecting light emitted from the projecting means passes through; and controlling means for performing control so as to reduce the intensity of the projecting light from the projecting means when the detecting means detects an object in the area to be subjected to detection.

More specifically, it is desirable that the area to be subjected to detection is located near the outer edge of the projection space area and extends along the outer edge of the projection space area.

A protector of a projector according to the present invention comprises detecting means for detecting the presence or absence of an object in an area to be subjected to detection, which is a local space near an outer edge of a projection space area which projecting light emitted from the projector passes through; and controlling means for performing control so as to reduce the intensity of the projecting light from the projector when the detecting means detects an object in the area to be subjected to detection.

In the projector or the protector thereof according to the present invention, the detecting means detects the passage of a person through the area to be subjected to detection before the person enters the projection space area, and the controlling means reduces the intensity of the projecting light from the projecting means. Therefore, the intensity of the projecting light is already reduced at the time when the person enters the projection space area. Moreover, the area to be subjected to detection is limited to the local space. Therefore, it is possible to prevent the detecting means from detecting an explaining person who stands near the screen, for example.

BRIEF DESCRIPTION OF THE DRAWINGS

These and other objects and features of the present invention will become clear from the following description of the preferred embodiments given with reference to the accompanying drawings, in which.

DESCRIPTION OF THE PREFERRED EMBODIMENTS

Embodiments of the present invention will be described in detail below with reference to the accompanying drawings.

[First embodiment]

Figure 1:
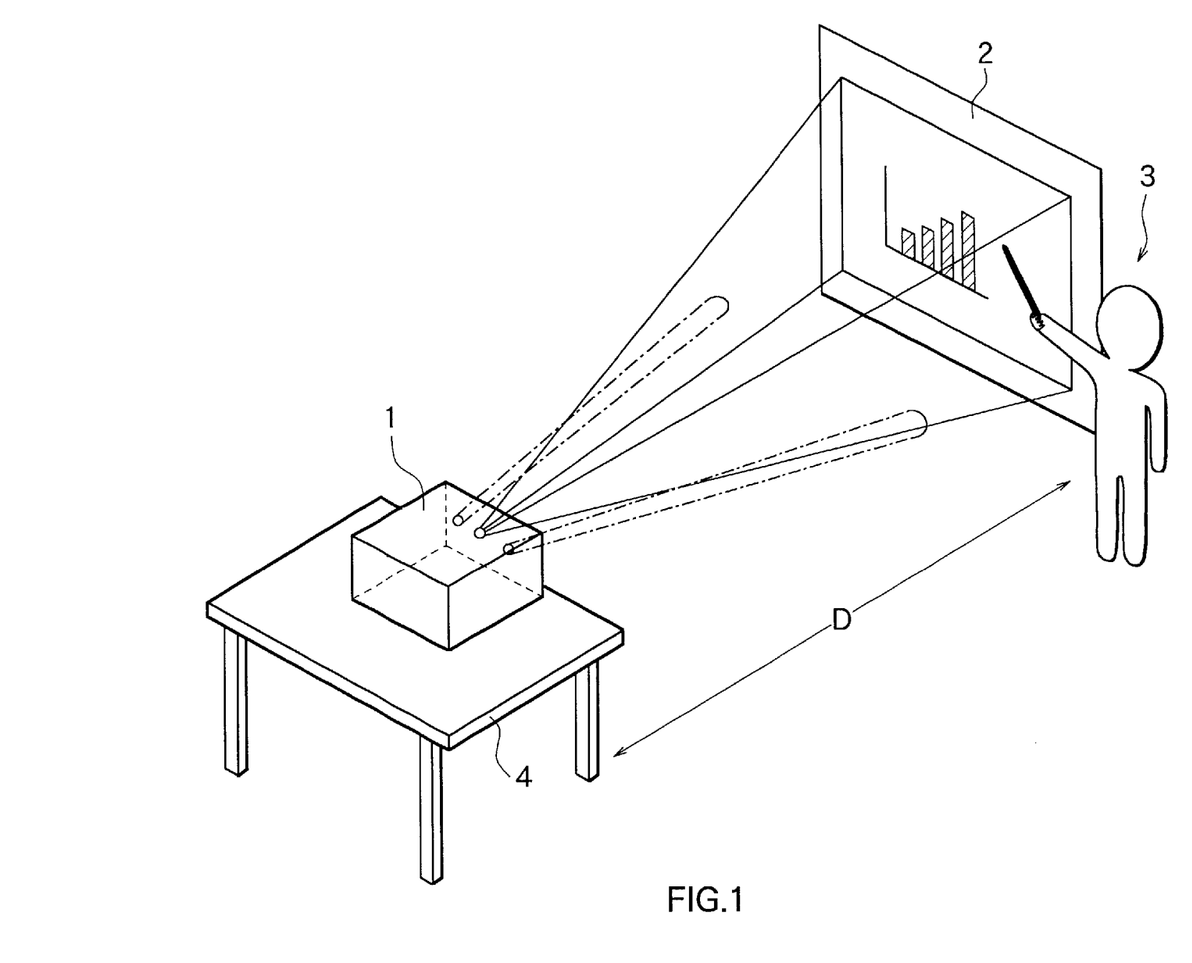
FIG. 1 is a perspective view of a situation in which a projector according to a first embodiment of the present invention is in use.

FIG. 1 shows a situation in which a projector 1 according to a first embodiment of the present invention is in use. The projector 1 is configured so as to be placed on, for example, a desk 4 and to project an image on a screen 2 located at a remote position. A distance D between the projector 1 and the screen 2 is about 3 m, for example.

Figure 2:
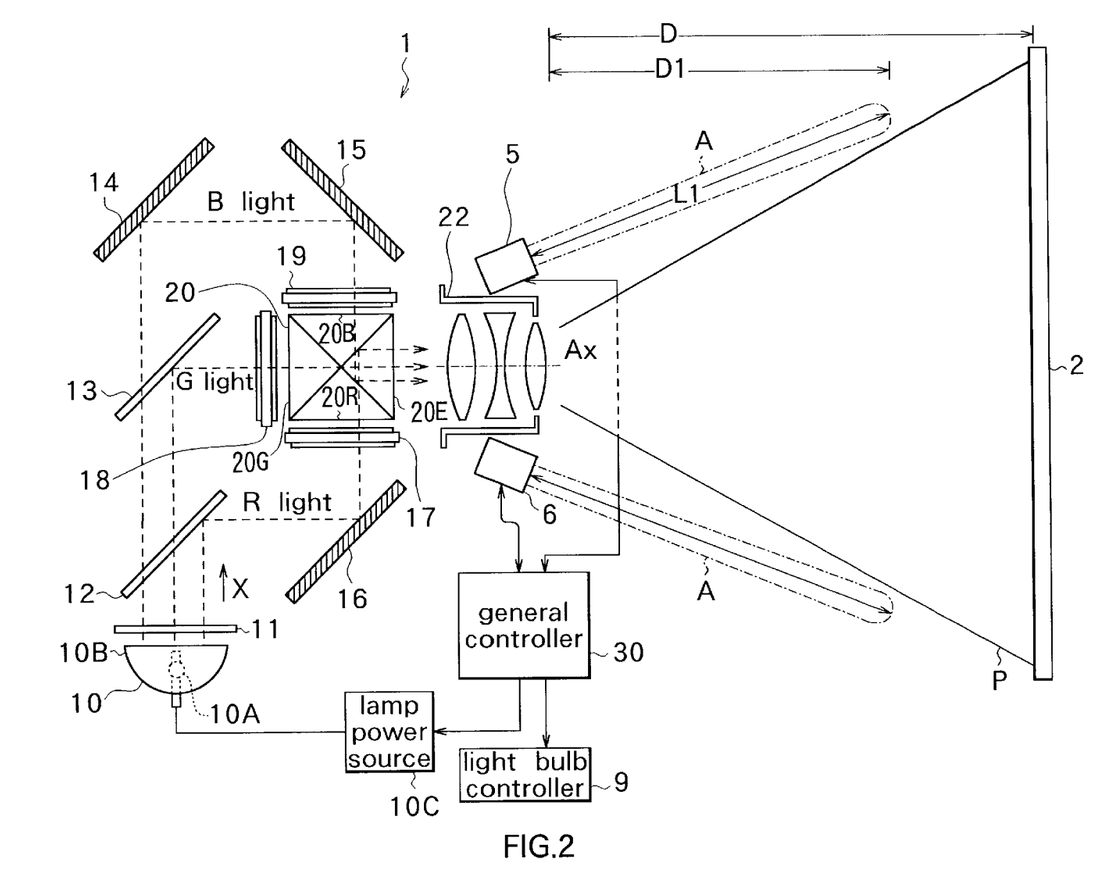
FIG. 2 is an illustration of a basic configuration of the projector shown in FIG. 1.

FIG. 2 shows a general configuration of the projector 1 shown in FIG. 1 and shows the projector 1 viewed from above. The projector 1 is a so-called three-panel type color projector using three liquid crystal light bulbs (liquid crystal panels) and comprises a lamp unit 10 for emitting substantially parallel rays of white light. A discharge tube having a substantially spherical shape, such as a metal halide lamp, is used as a light emitting source 10A of the lamp unit 10. The metal halide lamp is an improvement of a high pressure mercury lamp. The metal halide lamp comprises a housing made of silica glass or the like, and mercury vapor and other metal halide vapor sealed in the housing. The lamp unit 10 is driven by a lamp power source 10C. The lamp power source 10C is operated under output control of a general controller 30.

A parabolic mirror 10B is located around the light emitting source 10A of the lamp unit 10. The parabolic mirror 10B is an aspherical mirror formed by rotating a parabola around an axis of rotation. A dielectric multilayer for letting light in an ultraviolet region and an infrared region escape backward and for reflecting only visible light is formed on an inner surface of the parabolic mirror 10B. Thus, the dielectric multilayer prevents heat from being transferred to a frontward optical system. A direction of a pencil of substantially parallel rays emitted from the lamp unit 10 is referred to as an X direction.

A UV-IR cut filter 11, an R dichroic mirror 12, a G dichroic mirror 13 and a total reflection mirror 14 are arranged in order along the direction (X direction) of the light emitted from the lamp unit 10. The Uv-IR cut filter 11 cuts ultraviolet rays and infrared rays of the white light from the lamp unit 10 and transmits only the visible light.

All of the R dichroic mirror 12, the G dichroic mirror 13 and the total reflection mirror 14 are inclined at 45° relative to the direction (X direction) of the light emitted from the lamp unit 10. The R dichroic mirror 12 reflects only R light (red light) of the light that has passed through the UV-IR cut filter 11, and transmits G light (green light) and B light (blue light). The G dichroic mirror 13 reflects only the G light of the light (the G light and the B light) that has passed through the R dichroic mirror 12, and transmits the B light. The total reflection mirror 14 reflects all of the B light that has passed through the G dichroic mirror 13.

A total reflection mirror 16 for reflecting the reflected R light in the direction parallel to the direction (X direction) of the light emitted from the lamp unit 10 is located in an optical path of the R light reflected by the R dichroic mirror 12. A total reflection mirror 15 for reflecting the reflected B light in the direction opposite to the direction (X direction) of the light emitted from the lamp unit 10 is located in an optical path of the B light reflected by the total reflection mirror 14.

A dichroic prism 20 for combining light of three colors and letting the combined light exit therethrough is located at the position at which the R light, the G light and the B light reflected by the total reflection mirror 16, the G dichroic mirror 13 and the total reflection mirror 15, respectively, join one another. The dichroic prism 20 comprises four rectangular prisms bonded to one another, and dielectric multilayers are formed on bonded surfaces. The dichroic prism 20 has three planes of incidence 20R, 20G and 20B which the R light, the G light and the B light reflected by the total reflection mirror 16, the G dichroic mirror 13 and the total reflection mirror 15, respectively, enter through, and a plane of exit 20E for combining the light of three colors and letting the combined light exit therethrough.

An R liquid crystal light bulb 17, a G liquid crystal light bulb 18 and a B liquid crystal light bulb 19 for applying space modulation to incident light in response to an image signal for each color are located adjacent to the planes of incidence 20R, 20G and 20B of the dichroic prism 20, respectively. The R liquid crystal light bulb 17 applies space modulation to the R light reflected by the total reflection mirror 16 in response to an R image signal. The G liquid crystal light bulb 18 applies space modulation to the G light reflected by the G dichroic mirror 13 in response to a G image signal. The B liquid crystal light bulb 19 applies space modulation to the B light reflected by the total reflection mirror 15 in response to a B image signal.

A projection lens 22 for projecting the light combined by the dichroic prism 20 onto the screen 2 is located adjacent to the exit plane 20E of the dichroic prism 20.

In the projector 1, the white light emitted from the lamp unit 10 is separated into the light of three colors, i.e., R, G and B by the R dichroic mirror 12 and the G dichroic mirror 13. When the R light, the G light and the B light pass through the R liquid crystal light bulb 17, the G liquid crystal light bulb 18 and the B liquid crystal light bulb 19, respectively, the R light, the G light and the B light are subjected to space intensity modulation in response to the image signals for R, G and B, respectively. Modulated color images are combined into one image by the dichroic prism 20. The combined image is projected as a color image on the screen 2 by the projection lens 22. A section of the projector 1 between the lamp unit 10 and the projection lens 22 corresponds to a specific example of "projecting means" of the present invention. A space area (hereinafter referred to as a projection space area) P, which the light to be projected on the screen 2 by the projection lens 22 passes through, corresponds to a specific example of "a projection space area" of the present invention.

Sensors 5 and 6 for performing detection in local spaces adjacent to the projection space area P as areas to be subjected to detection are located on both left and right sides of the projection lens 22. The sensors 5 and 6 correspond to a specific example of "detecting means" of the present invention. In the following description, the side of the screen 2 viewed from the side of the projector 1 is defined as "the frontward side", and "the left side" and "the right side" are defined relative to "the frontward side".

Figure 3:
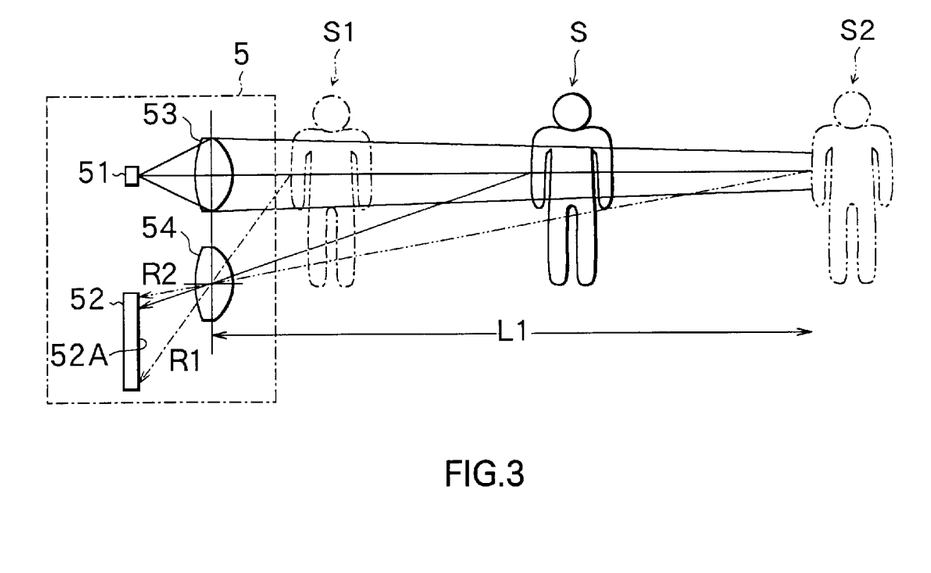
FIG. 3 is an illustration of the principle of operation of a sensor of the projector shown in FIG. 1.

FIG. 3 illustrates the principle of detection of a subject by the left sensor 5. The sensor 5 comprises a light emitting device 51 for emitting an infrared beam, and a photodetector 52 for detecting the infrared beam reflected from a subject S of detection. The light emitting device 51 comprises an infrared light emitting diode (IRED), for example. The photodetector 52 comprises a phototransistor. In the embodiment, the light emitting device 51 and the photodetector 52 are vertically arranged. However, the light emitting device 51 and the photodetector 52 can be horizontally arranged.

As shown in FIG. 3, a projection lens 53 for changing diverging rays emitted from the light emitting device 51 into substantially parallel rays of light is located on the light emitting side of the light emitting device. A condenser lens 54 for focusing the returned light (substantially parallel rays of light) reflected by the subject S of detection on a photo-detection plane 52A of the photodetector 52 is located on the light incidence side of the photodetector 52 which the light enters through. The projection lens 53 and the condenser lens 54 are each composed of an aspherical lens, for example.

The photo-detection plane 52A of the photodetector 52 has an area (a vertical length in FIG. 3) large enough to detect reflected light R1 from a subject S1 of detection located immediately close to the sensor 5, reflected light R2 from a subject S2 of detection located at a distance L1 from the sensor 5 and reflected light R from the subject S of detection located between the subject S1 of detection and the subject S2 of detection. When the distance between the sensor 5 and the subject S of detection exceeds the predetermined value L1, the reflected light from the subject S of detection goes off the photo-detection plane 52A of the photodetector 52. That is, the area to be subjected to detection by the sensor 5 is a limited space ranging between the sensor 5 and a location the predetermined distance L1 from the sensor 5.

Figure 4:
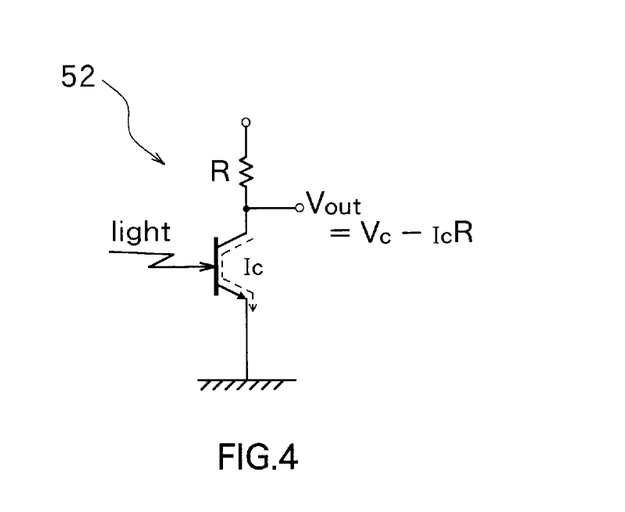
FIG. 4 is an illustration of the principle of operation of a photodetector.

FIG. 4 illustrates the principle of operation of the photodetector 52. The photodetector 52 comprises a phototransistor in which voltage Vc is applied to between a collector and an emitter through a resistor R, for example. When a base is irradiated with light, a collector current Ic passes through the base due to a photovoltaic effect and an amplification effect. Output voltage Vout is equal to Vc under no irradiation with light. However, the output voltage Vout is changed to Vc−Ic·R under irradiation with light. In other words, output of the photodetector 52 is changed from H (High) level to L (Low) level under irradiation with light.

The right sensor 6 operates on the same principle as the principle of the abovedescribed left sensor 5. As shown in FIG. 2, the left and right sensors 5 and 6 are inclined at a predetermined angle relative to an optical axis Ax of the projection lens 22. Thus, the direction of the light emitted from the respective light emitting devices 51 and 61 (shown in FIG. 5) of the sensors 5 and 6 extends along the direction in which an outer edge of the projection space area P extends. A distance D1 between the projector 1 and the farthest end of an area A to be subjected to detection is expressed as a distance along the optical axis Ax of the projection lens 22.

In FIG. 2, the intensity of projecting light from the projector 1 is expressed as luminous flux that is one of photometric values. For example, when the intensity of the projecting light is equal to 2000 lm (lumen), the distance D1 between the projector 1 and the farthest end of the area A to be subjected to detection along the direction of the optical axis Ax of the projection lens 22 (hereinafter referred to as the direction to the screen) is set at 2 m, for instance. Experiments and so on show that, when the luminous flux of the light emitted from the projector 1 is equal to 2000 lm, a person suffers little damage to his/her eyes even if he/she looks into the projection lens 22 of the projector 1 at a distance of 2 m or more from the projector 1.

Figure 5:
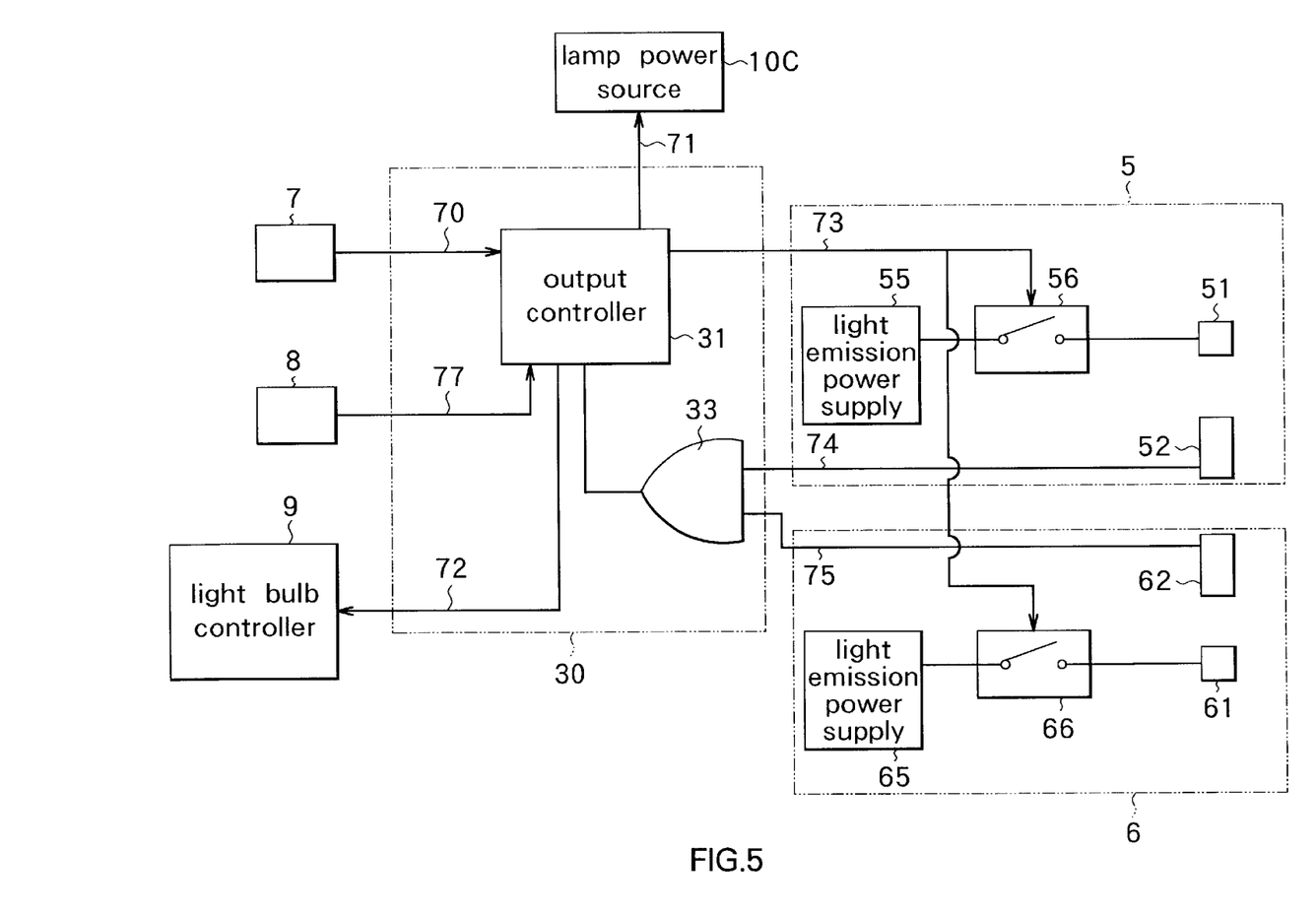
FIG. 5 is a block diagram of a control system of the projector shown in FIG. 1.

FIG. 5 is a block diagram of a control system of the projector 1 according to the embodiment. The lamp power source 10C, a pair of left and right sensors 5 and 6, a power switch 7 and a reset switch 8 are connected to the general controller 30 of the projector 1. A light bulb controller 9 for controlling driving of the liquid crystal light bulbs 17, 18 and 19 is also connected to the general controller 30, but the detailed description of the light bulb controller 9 is omitted.

The general controller 30 has an output controller 31 comprising a CPU (central processing unit), for example. Upon receipt of an ON signal 70 from the power switch 7, the output controller 31 outputs a lamp control signal 71 to the lamp power source 10C and outputs a light emission start signal 73 to the sensors 5 and 6 simultaneously with output of the lamp control signal 71. The lamp control signal 71 is a signal for allowing the lamp unit 10 (see FIG. 2) to emit light at 2 kW, for example. The light emission start signal 73 is a signal for driving the light emitting devices 51 and 61 of the sensors 5 and 6 and thereby allowing the light emitting devices 51 and 61 to emit an infrared beam.

The general controller 30 has an AND gate 33 for ANDing photo-detection signals 74 and 75 from the photodetectors 52 and 62 of the sensors 5 and 6. An output terminal of the AND gate 33 is connected to the output controller 31 so that the AND of the photo-detection signals from the photodetectors 52 and 62 of the sensors 5 and 6 may be captured in the output controller 31.

The reset switch 8 connected to the general controller 30 is operated in order to again turn on the lamp power source 10C once turned off. Upon receipt of a reset signal 77 from the reset switch 8, the output controller 31 restarts outputting the lamp control signal to the lamp power source 10C. The general controller 30 configured as described above corresponds to a specific example of "controlling means" of the present invention.

The left sensor 5 comprises a switch 56 for turning on or off the light emitting device 51, and a light emission power supply 55 for supplying power to the light emitting device 51. Similarly, the right sensor 6 comprises a switch 66 for turning on or off the light emitting device 61, and a light emission power supply 65 for supplying power to the light emitting device 61.

Next, operation of the projector 1 configured as described above will be described. When a user turns on the power switch 7 of the projector 1, the output controller 31 of the general controller 30 outputs the lamp control signal 71 to the lamp power source 10C and thus the lamp unit 10 (see FIG. 2) starts emitting white light. Moreover, the output controller 31 transmits a control start signal 72 to the light bulb controller 9. Thus, the light bulb controller 9 starts capturing image data from external equipment (a computer or the like), controlling driving of the liquid crystal light bulbs 17, 18 and 19, and so on.

When driving control of the lamp unit 10 and the light bulb controller 9 is started, the white light emitted from the lamp unit 10 shown in FIG. 2 is separated into the light of three colors, i.e., R, G and B by the R dichroic mirror 12 and the G dichroic mirror 13. When the R light, the G light and the B light pass through the R liquid crystal light bulb 17, the G liquid crystal light bulb 18 and the B liquid crystal light bulb 19, respectively, the R light, the G light and the B light are subjected to space intensity modulation in response to the image signals for R, G and B, respectively. Modulated color images are combined into one image by the dichroic prism 20. The combined image is projected as a color image on the screen 2 by the projection lens 22.

On the other hand, the output controller 31 outputs the light emission start signal 73 to the sensors 5 and 6 substantially simultaneously with transmission of the lamp control signal 71 to the lamp power source 10C. In the sensors 5 and 6, the switches 56 and 66 are turned on in accordance with the light emission start signal 73 from the output controller 31, and thus the light emission power supplies 55 and 65 supply power to the light emitting devices 51 and 61, respectively. Thus, the light emitting devices 51 and 61 of the sensors 5 and 6 start emitting an infrared beam. When not detecting the reflected light from the subject of detection, the photodetectors 52 and 62 of the sensors 5 and 6 output a H-level voltage signal as the photo-detection signals 74 and 75 to the AND gate 33 of the general controller 30.

When a person enters the area A (see FIG. 2) to be subjected to detection by the sensor 5, the infrared beam emitted from the light emitting device 51 strikes the person and thus the reflected infrared beam enters into the photodetector 52. When the photodetector 52 detects the infrared beam, the photodetector 52 outputs a L-level voltage signal as the photo-detection signal 74 to the AND gate 33 of the general controller 30. When a person enters the area A (see FIG. 2) to be subjected to detection by the sensor 6, the infrared beam emitted from the light emitting device 61 strikes the person and thus the reflected infrared beam enters into the photodetector 62. When the photodetector 62 detects the infrared beam, the photodetector 62 outputs a L-level voltage signal as the photo-detection signal 75 to the AND gate 33 of the general controller 30.

When an input signal from at least one of the photodetectors 52 and 62 (i.e., either the photo-detection signal 74 or 75) enters L level, the AND gate 33 outputs a L-level signal to the output controller 31. Upon receipt of the L-level signal from the AND gate 33, the output controller 31 determines that "a person enters the area A to be subjected to detection" and outputs a stop signal to the lamp power source 10C. The stop signal causes the lamp power source 10C to be turned off, and thus the lamp unit 10 (see FIG. 2) stops emitting the white light. That is, the projector 1 stops projecting, and thus the projecting light goes out. Instead of the stop of light emission of the lamp unit 10, the intensity of the projecting light may be reduced to, for example, about ⅓ by reducing the quantity of light to be emitted from the lamp unit 10 to, for example, about ⅓.

The reset switch 8 is turned on in order that the projector 1 restarts projecting. When the reset switch 8 is turned on, the output controller 31 receives the reset signal 77, again outputs the lamp control signal 71 to the lamp power source 10C and outputs the light emission start signal 73 to the sensors 5 and 6. In this manner, the projector 1 restarts projecting an image on the screen 2.

As described above, the projector 1 according to the embodiment stops projecting as soon as a person enters the area A to be subjected to detection adjacent to the outside of the projection space area P. Therefore, the projector 1 further improves safety as compared to a projector which stops projecting only after a person enters the projection space area.

Moreover, the area A to be subjected to detection is limited to a local range (which is shorter than the distance between the projector 1 and the screen 2). Thus, the projector 1 does not detect an explaining person 3 who is near the screen 2 as shown in FIG. 1, and does not stop projecting. Accordingly, the projector 1 is prevented from unnecessarily stopping projecting, and therefore practicality improves thereby.

In the embodiment, the output of the lamp unit 10 is about 2 kW, and the luminous flux of the projecting light is about 2000 lm. However, the output of the lamp unit 10 may be about 500 W, and the luminous flux of the projecting light may be about 500 lm. In this case, it is preferable that the maximum detection distance DI between the projector 1 and the farthest end of the area A to be subjected to detection is reduced (to about 0.8 m, for example) in accordance with a reduction in the intensity of the projecting light.

Figure 6:
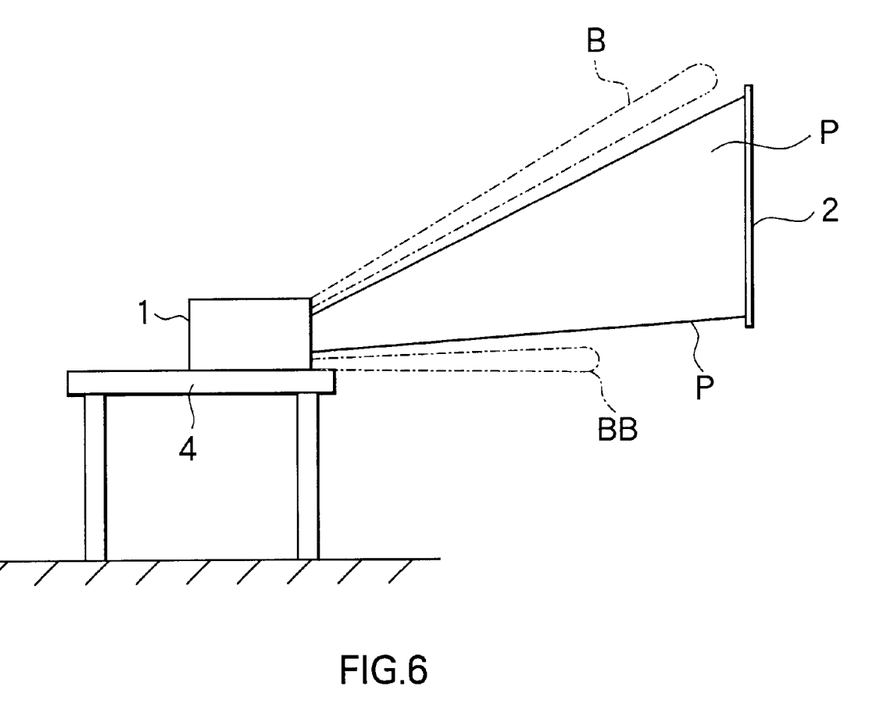
FIG. 6 is an illustration of a modification of the first embodiment.

FIG. 6 shows a modification of the embodiment. FIG. 6 shows a situation viewed from the side. In the modification, areas B and B' to be subjected to detection are located over and under the projection space area P, respectively. Such a configuration allows the projector 1 to stop projecting when a person enters the projection space area P from over or under the projection space area P. When a person is hardly likely to enter the projection space area P from under the projection space area P, the length of the lower area BB to be subjected to detection may be shorter than that of the upper area B to be subjected to detection. In addition to the provision of the above-mentioned area A to be subjected to detection (see FIG. 2) on the left and right sides of the projection space area P, the areas B and BB to be subjected to detection may be provided over and under the projection space area P, respectively. Such a configuration allows the projector 1 to stop projecting even when a person enters the projection space area P from any direction, i.e., over or under the projection space area P or the left or right side of the projection space area P. The length of the maximum detection distance D1 of the left area A to be subjected to detection may differ from the length of the maximum detection distance D1 of the right area A to be subjected to detection.

[Second embodiment]

Next, a projector according to a second embodiment of the present invention will be described. In the second embodiment, the intensity of the projecting light from the projector (the output of the lamp unit) is variable, and areas to be subjected to detection by sensors 50 and 60 are changed in accordance with the intensity of the projecting light.

In the projector according to the second embodiment, the output of the lamp unit 10 (see FIG. 2) can be set in three levels, e.g., at 2 kW, 1 kW and 500 W. In accordance with each output of the lamp unit 10 (see FIG. 2), the intensity (luminous flux) of the projecting light from the projector is 2000 lm, 1000 lm and 500 lm at, for example, 2 kW, 1 kW and 500 W, respectively.

Figure 7:
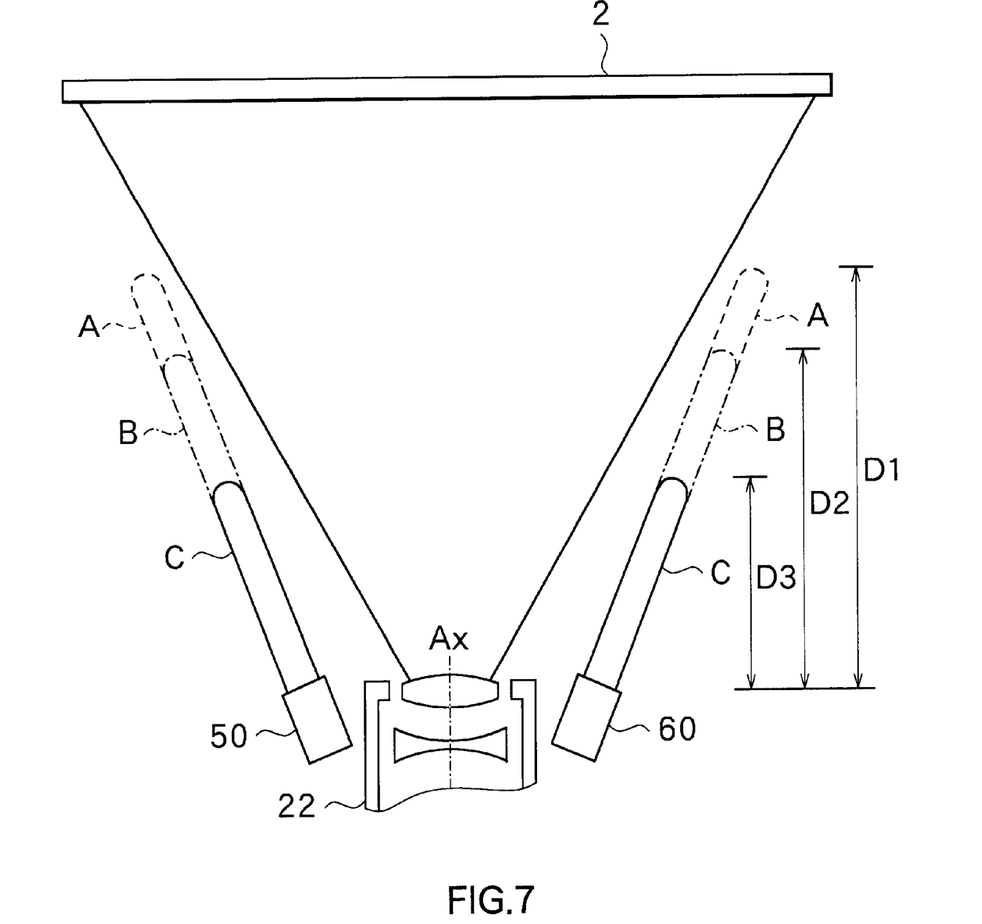
FIG. 7 is an illustration of areas to be subjected to detection by a projector according to a second embodiment of the present invention.

FIG. 7 shows the areas to be subjected to detection by the sensors 50 and 60 of the projector according to the second embodiment. Each of the sensors 50 and 60 has three areas A, B and C to be subjected to detection, which differ from one another in the distance between the projector and the farthest end of the area to be subjected to detection. The distance D1 between the projector 1 and the farthest end of the area A to be subjected to detection is set at 2 m, for example. A distance D2 between the projector 1 and the farthest end of the area B to be subjected to detection is set at 1.4 m, for example. A distance D3 between the projector 1 and the farthest end of the area C to be subjected to detection is set at 0.8 m, for example. All of the areas A, B and C to be subjected to detection are located on the outside of the projection space area P and extend along the projection space area P.

The above-mentioned distances D1 (2 m), D2 (1.4 m) and D3 (0.8 m) between the projector 1 and the farthest ends of the areas A, B and C to be subjected to detection are set in accordance with the luminous flux of the projecting light from the projector, i.e., 2000 lm, 1000 lm and 500 lm, respectively. Experiments and so on show that, when the luminous flux of the projecting light is 2000 lm, 1000 lm and 500 lm, a person suffers little damage to his/her eyes even if he/she looks into the projection lens 22 of the projector at a distance of 2 m or more, 1.4 m or more and 0.8 m or more from the projector.

Figure 8A:
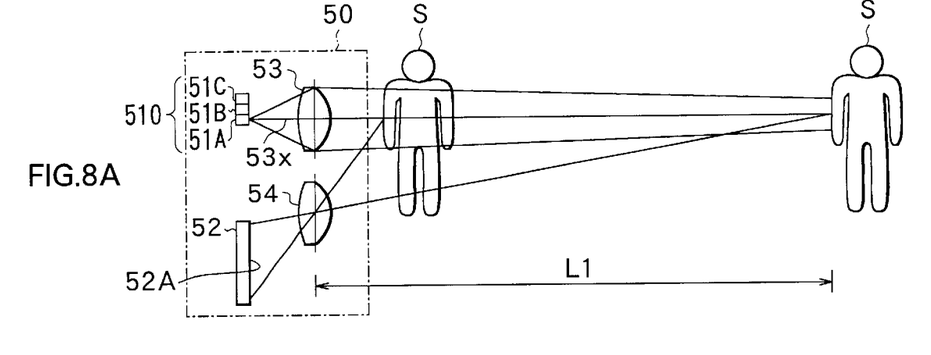
FIGS. 8A to 8C are illustrations of the principle of operation of a sensor of the projector shown in FIG. 7.
Figure 8B:
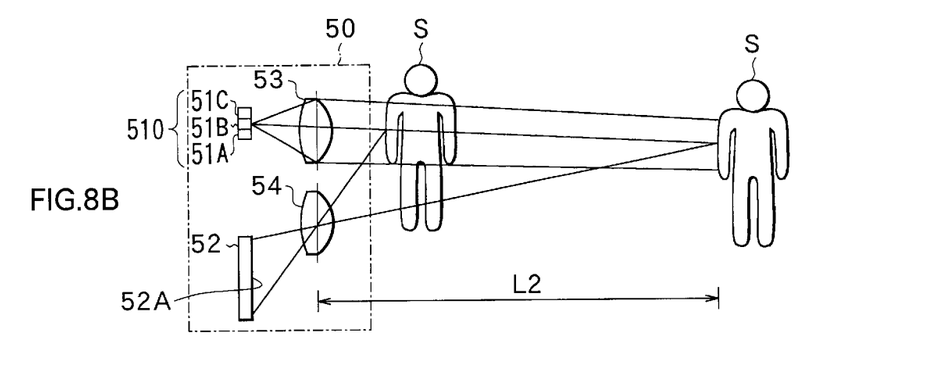
Figure 8C:
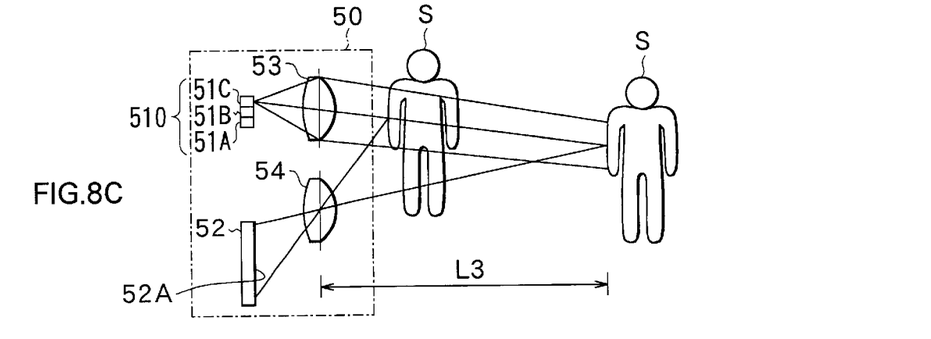

FIGS. 8A to 8C are illustrations of the configuration of the sensor 50 and the principle of operation thereof. The sensor 50 is configured in the same manner as the sensor 5 (see FIG. 3) according to the first embodiment except that the sensor 50 comprises a light emitting device array 510. The light emitting device array 510 of the sensor 50 comprises, for example, a vertical array of three light emitting devices 51A, 51B and 51C, each of which is made of an infrared light emitting diode (IRED), for instance. The light emitting device 51A is located on an optical axis 53$x$ of the projection lens 53. The light emitting device 51B adjacent to the light emitting device 51A is located slightly away from the optical axis 53$x$. The light emitting device 51C is located farthest from the optical axis 53$x$.

As shown in FIG. 8A, when the light emitting device 51A emits an infrared beam, the maximum distance L1 between the sensor 50 and the subject S of detection, at which reflected light can be detected by the photo-detection plane 52A of the photodetector 52, is equal to the distance L1 of the first embodiment shown in FIG. 3.

As shown in FIG. 8B, when the light emitting device 51B emits an infrared beam, the infrared beam travels while being inclined at an angle corresponding to the deviation of the light emitting device 51B from the optical axis 53x of the projection lens 53. Therefore, a maximum distance L2 between the sensor 50 and the subject S of detection, at which reflected light can be detected by the photo-detection plane 52A of the photodetector 52, is shorter than the distance L1 shown in FIG. 8A.

As shown in FIG. 8C, when the light emitting device 51C emits an infrared beam, the infrared beam travels while being further inclined, because the light emitting device 51C is located farthest from the optical axis 53x of the projection lens 53. Therefore, a maximum distance L3 between the sensor 50 and the subject S of detection, at which reflected light can be detected by the photo-detection plane 52A of the photodetector 52, is still shorter than the distance L2 shown in FIG. 8B.

In other words, the sensor 50 of the second embodiment can have three types of areas to be subjected to detection by selectively using the three light emitting devices 51A, 51B and 51C which differ from one another in the distance between the light emitting device and the optical axis 53x of the projection lens 53. Incidentally, the configuration of the right sensor 60 is identical to that of the above-mentioned left sensor 50.

Figure 9:
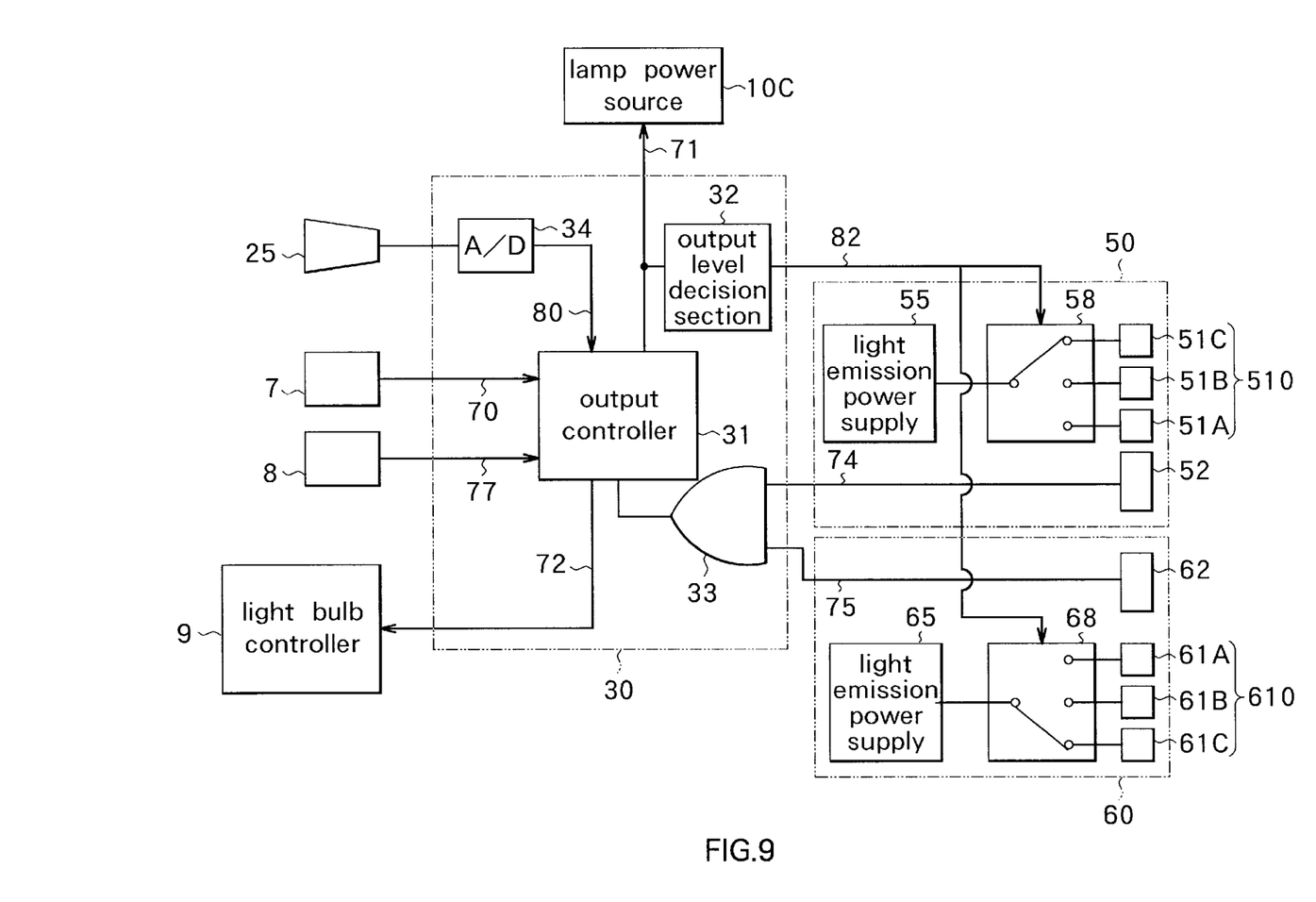
FIG. 9 is a block diagram of a control system of the projector shown in FIG. 7.

FIG. 9 is a block diagram of a control system of the projector of the second embodiment. The same components as the components of the first embodiment are indicated by the same reference numerals, and the description thereof is omitted.

An output setting knob 25 for setting the output of the lamp unit 10 in three levels, e.g., at 2 kW, 1 kW and 500 W is connected to the general controller 30. A lamp output setting signal 80 is inputted to the output controller 31 of the general controller 30 through an A/D converter 34 by operating the output setting knob 25. The output controller 31 is configured so as to output the lamp control signal 71 to the lamp power source 10C of the lamp unit 10 in accordance with the lamp output setting signal 80. The general controller 30 has an output level decision section 32 for deciding the level of the output of the lamp unit 10. The output level decision section 32 is configured so as to monitor the lamp control signal 71 transmitted from the output controller 31 to the lamp power source 10C, to decide the lamp output in three levels in accordance with the lamp control signal 71 and to output a select signal 82 to the sensors 50 and 60 in accordance with the result of decision.

The left sensor 50 comprises a select switch 58 for selecting one of the three light emitting devices 61A, 51B and 51C of the light emitting device array 510 in accordance with the select signal 82, and the light emission power supply 55 for supplying power to the light emitting device selected by the select switch 58. Similarly, the right sensor 60 comprises a select switch 68 for selecting one of three light emitting devices 61A, 61B and 61C of a light emitting device array 610 in accordance with the select signal 82, and the light emission power supply 65 for supplying power to the light emitting device selected by the select switch 68. The sensors 50 and 60 select one of the light emitting devices 51A, 51B and 51C and one of the light emitting devices 61A, 61B and 61C, respectively, in accordance with the select signal from the output controller 31.

The general controller 30 also has the AND gate 33 for ANDing the photo-detection signals 74 and 75 from the photodetectors 52 and 62 of the sensors 50 and 60. The output terminal of the AND gate 33 is connected to the output controller 31 so that the AND of the photo-detection signals 74 and 75 from the photodetectors 52 and 62 of the sensors 50 and 60 may be captured in the output controller 31.

Although the light emitting devices 51A, 51B and 51C of the light emitting device array 510 are, in fact, vertically arranged as shown in FIGS. 8A to 8C, the light emitting devices 51A, 51B and 51C are shown as horizontally arranged in FIG. 9. Similarly, the light emitting devices 61A, 61B and 61C of the light emitting device array 610 are, in fact, vertically arranged, but the light emitting devices 61A, 61B and 61C are shown as horizontally arranged in FIG. 9.

Next, operation of the projector according to the second embodiment will be described. When a user turns on the power switch 7 of the projector, the general controller 30 of the projector 1 outputs the lamp control signal 71 to the lamp power source 10C in accordance with the lamp output setting signal 80 generated by operating the output setting knob 25. The output level decision section 32 monitors the lamp control signal 71, decides the output of the lamp unit 10 in three levels and outputs the select signal 82 to the sensors 50 and 60.

Furthermore, the output controller 31 transmits the control start signal 72 to the light bulb controller 9. Thus, the light bulb controller 9 starts capturing image data from external equipment (a computer or the like), controlling driving of the R, G and B liquid crystal light bulbs 17, 18 and 19, and so on. When driving control of the lamp unit 10 and the light bulb controller 9 is started, a color image is projected on the screen 2 by the projection lens 22 in the same manner as the first embodiment.

In the sensors 50 and 60, the select switches 58 and 68 operate in accordance with the select signal 82 from the output controller 31 and select one light emitting device of the light emitting device array 510 and one light emitting device of the light emitting device array 610, respectively. Thus, the light emission power supplies 55 and 65 supply power to the selected light emitting devices. Thus, one of the light emitting devices 51A, 51B and 51C of the light emitting device array 510 starts emitting an infrared beam, and one of the light emitting devices 61A, 61B and 61C of the light emitting device array 610 starts emitting an infrared beam.

It is now assumed that the light emitting devices 51B and 61B of the light emitting device arrays 510 and 610 are selected. In this case, the area to be subjected to detection is the area B to be subjected to detection (see FIG. 7).

When a person enters the area B (see FIG. 7) to be subjected to detection by the sensor 50, the infrared beam emitted from the light emitting device 51B strikes the person and thus the reflected infrared beam enters into the photodetector 52. When the photodetector 52 detects the infrared beam, the photodetector 52 outputs a L-level voltage signal as the photo-detection signal 74 to the AND gate 33 of the general controller 30. When a person enters the area B (see FIG. 7) to be subjected to detection by the sensor 60, the infrared beam emitted from the light emitting device 61B strikes the person and thus the reflected infrared beam enters into the photodetector 62. When the photodetector 62 detects the infrared beam, the photodetector 62 outputs an L-level voltage signal as the photo-detection signal 75 to the AND gate 33 of the general controller 30.

When an input signal (the photo-detection signal) from at least one of the photodetectors 52 and 62 enters L level, the AND gate 33 outputs an L-level signal to the output controller 31. Upon receipt of the L-level signal from the AND gate 33, the output controller 31 determines that "a person enters the area B to be subjected to detection" and outputs a stop signal to the lamp power source 10C. The stop signal causes the lamp power source 10C to be turned off, and thus the lamp unit 10 (see FIG. 2) stops emitting the white light. That is, the projector stops projecting, and thus the projecting light goes out.

When the light emitting devices 51A and 61A emit an infrared beam (i.e., when the area A to be subjected to detection is selected), and when the light emitting devices 51C and 61C emit an infrared beam (i.e., when the area C to be subjected to detection is selected), the same processing of stopping projection takes place. Instead of the stop of emission of white light of the lamp unit 10, the luminous flux of the projecting light from the projector may be reduced to, for example, about ⅓ by reducing the quantity of light to be emitted from the lamp unit 10 to, for example, about ⅓.

The reset switch 8 is turned on in order that the projector restarts projecting. When the reset switch 8 is turned on, the output controller 31 receives the reset signal 77, again outputs the lamp control signal 71 to the lamp power source 10C and outputs the select signal 82 to the sensors 50 and 60. In this manner, the projector restarts projecting an image on the screen 2.

As described above, the projector according to the embodiment selects the length (maximum detection distance) of the area to be subjected to detection in accordance with the intensity of the projecting light. Therefore, the projector can further improve practicality while keeping greater safety. Assume that the maximum detection distance of the area to be subjected to detection by the sensor is fixed. In this case, when the intensity of the projecting light is increased in order to improve luminance of an image, even a person who is out of the area to be subjected to detection may suffer damage to his/her eyes. When the intensity of the projecting light is reduced in order to improve luminance of an image, the maximum detection distance of the area to be subjected to detection becomes longer than necessary. Thus, the sensor detects even a person who is at a position that does not inherently require detecting. As a result, a protector operates unnecessarily. On the other hand, according to the embodiment, the maximum detection distance of the area to be subjected to detection by the sensor is changed in accordance with the intensity of the projecting light. Thus, a problem, which arises in the case of a fixed maximum detection distance, does not arise. Therefore, the projector according to the embodiment can more reliably ensure safety and can ensure more practical operation.

In the embodiment, the maximum detection distance is changed in three levels in accordance with the intensity of the projecting light. However, the maximum detection distance may be changed in two levels, or in four levels or more. Furthermore, the maximum detection distance may be changed smoothly rather than in levels.

Although the present invention has been described above by referring to some embodiments, the invention is not limited to these embodiments and various modifications of the invention are possible. For example, a movable shutter, which shields the projecting light from the projection lens 22 when the sensors 5 and 6 (or the sensors 50 and 60) detect a person, may be provided on a front face of the projection lens 22 of the projector.

Instead of stopping of projection of the projector, a voice message, e.g., "watch out" may be outputted when the sensors 5 and 6 (or the sensors 50 and 60) detect a person. A detection off switch for preventing the sensors 5 and 6 (or the sensors 50 and 60) from operating may be provided.

According to the projector and the protector thereof described above, detecting means detects the presence or absence of an object in a local space near an outer edge of a projection- space area which projecting light emitted from the projector passes through. Thus, a sensor does not detect a person who does not require detecting (e.g., an explaining person who is near the screen), and therefore the projector does not unnecessarily stop projecting. As a result, an effect of improving practicality is achieved.

While the invention has been described with reference to specific embodiments chosen for purpose of illustration, it should be apparent that numerous modifications could be made thereto by those skilled in the art without departing from the basic concept and scope of the invention.

What is claimed is:

1. A projector for displaying a number of images on a screen, said projector comprising:

projecting means for projecting light therefrom so as to cause an image to be displayed on the screen located at a remote position;

detecting means for detecting the presence or absence of an object in an area to be subjected to detection, which is a local space near an outer edge of a projection space area wherein projecting light emitted from the projecting means passes through and which does not extend to a plane defined by the screen; and controlling means for controlling the projecting means so as to reduce the intensity of the projecting light from the projecting means when the detecting means detects an object in the area to be subjected to detection.

2. A projector according to claim 1, wherein the area to be subjected to detection is located on the outside of the projection space area and extends along the outer edge of the projection space area.

3. A projector according to claim 1, wherein the detecting means comprises a light emitting device for emitting light in a direction substantially parallel to the outer edge of the projection space area, and a photodetector for detecting the light reflected by the object that is a subject of detection.

4. A projector according to claim 3, wherein the light emitting device of the detecting means emits invisible light.

5. A projector for displaying a number of images on a screen, said projector comprising:

projecting means for projecting light therefrom so as to cause an image to be displayed on the screen located at a remote position;

detecting means for detecting the presence or absence of an object in an area to be subjected to detection, which is a local space near an outer edge of a projection space area which projecting light emitted from the projecting means passes through; and controlling means for controlling the projecting means so as to reduce the intensity of the projecting light from the projecting means when the detecting means detects an object in the area to be subjected to detection, wherein a maximum perpendicular distance of a maximum detection distance, which is a perpendicular distance between the projecting means and a plane parallel to the screen which includes the farthest end of the area to be subjected to detection away from the detecting means, is shorter than a perpendicular distance between the projecting means and the screen.

6. A projector according to claim 5, wherein the maximum detection distance is equal to or longer than a distance at which intensity of the projecting light emitted from the projecting means attenuates to safety intensity that does not do damage to the eyes of a person.

7. A projector according to claim 5, wherein a plurality of maximum detection distances can be set.

8. A projector according to claim 7, wherein one of the plurality of maximum detection distances is selected in accordance with the intensity of the projecting light emitted from the projecting means.

9. A protector for use in a projector for projecting an image on a screen located at a remote position, comprising:
 detecting means for detecting the presence or absence of an object in an area to be subjected to detection, which is a local space near an outer edge of a projection space area which projecting light emitted from the projector passes through; and
 controlling means for controlling the projector so as to reduce the intensity of the projecting light from the projector when the detecting means detects an object in the area to be subjected to detection,
 wherein a maximum perpendicular distance of a maximum detection distance, which is a perpendicular distance between the projector and a plane parallel to the screen which includes the farthest end of the area to be subjected to detection away from the detecting means, is shorter than a perpendicular distance between the projector and the screen.

10. A protector of the projector according to claim 9, wherein the maximum detection distance is equal to or longer than a distance at which intensity of the projecting light emitted from the projector attenuates to safety intensity that does not damage the eyes of a person.

11. A protector for use in a projector for projecting an image on a screen located at a remote position, comprising:
 detecting means for detecting the presence or absence of an object in an area to be subjected to detection, which is a local space near an outer edge of a projection space area wherein projecting light emitted from the projector passes through and which does not extend to a plane defined by the screen; and
 controlling means for controlling the projector so as to reduce the intensity of the projecting light from the projector when the detecting means detects an object in the area to be subjected to detection.

12. A protector of the projector according to claim 11, wherein the area to be subjected to detection is located on the outside of the projection space area and extends along the outer edge of the projection space area.

13. A protector of the projector according to claim 11, wherein a plurality of maximum detection distances can be set.

14. A protector of the projector according to claim 13, wherein one of the plurality of maximum detection distances is selected in accordance with the intensity of the projecting light emitted from the projector.

* * * * *